United States Patent
Merical et al.

(10) Patent No.: US 9,966,743 B1
(45) Date of Patent: May 8, 2018

(54) SYSTEM FOR ISOLATING COAXIAL CABLES FROM EACH OTHER AND FROM AN ANTENNA TOWER

(71) Applicant: PDS Electronics, Inc., Tallmadge, OH (US)

(72) Inventors: Edward L. Merical, Canal Fulton, OH (US); Christopher R. Cummings, Newton Falls, OH (US)

(73) Assignee: PDS Electronics, Inc., Tallmadge, OH (US)

( * ) Notice: Subject to any disclaimer, the term of this patent is extended or adjusted under 35 U.S.C. 154(b) by 0 days. days.

(21) Appl. No.: 15/598,525

(22) Filed: May 18, 2017

(51) Int. Cl.
  *F16L 3/22* (2006.01)
  *H02G 3/04* (2006.01)
  *F16L 3/06* (2006.01)

(52) U.S. Cl.
  CPC .............. *H02G 3/0456* (2013.01); *F16L 3/06* (2013.01)

(58) Field of Classification Search
  CPC .......... H02G 3/0456; H02G 3/30; H02G 3/32; F16L 3/06; F16L 3/22; F16L 3/221; F16L 3/222; F16L 3/2235
  USPC .................. 248/68.1, 72–73, 218.4
  See application file for complete search history.

(56) References Cited

U.S. PATENT DOCUMENTS

| | | | | |
|---|---|---|---|---|
| 2,451,699 A | * | 10/1948 | Twaroski | F16L 3/223 248/74.3 |
| 5,146,720 A | * | 9/1992 | Turner | H02G 3/22 249/214 |
| 5,393,021 A | * | 2/1995 | Nelson | F16L 3/127 248/71 |
| 2012/0200978 A1 | * | 8/2012 | Miller | H01Q 1/50 361/118 |
| 2012/0325983 A1 | * | 12/2012 | Vrame | F16L 3/22 248/68.1 |
| 2015/0270654 A1 | * | 9/2015 | Islam | H01R 13/518 439/529 |

* cited by examiner

Primary Examiner — Christopher Garft
(74) Attorney, Agent, or Firm — Renner, Kenner, Greive, Bobak, Taylor & Weber

(57) ABSTRACT

A system is provided which carries cables isolated from each other and isolated from a tower which carries antennas for the cables. The system includes a support plate carried near the top of the tower which carries strain relief devices for gripping each cable. A plurality of guide plates are spaced along the tower and each plate carries inserts which provide apertures of a predetermined size to match the size of the cable passing therethrough. The apertures are spaced from each other and spaced from the tower. An additional plate is attached to the tower near the bottom thereof and is provided with connector assemblies so that the cables may be attached to a send/receive unit.

15 Claims, 7 Drawing Sheets

US 9,966,743 B1

SYSTEM FOR ISOLATING COAXIAL CABLES FROM EACH OTHER AND FROM AN ANTENNA TOWER

TECHNICAL FIELD

This invention relates to a system for attaching one or more coaxial cables to an antenna tower. More specifically, this invention relates to such a system which isolates the cables from each other and from the tower.

BACKGROUND ART

It is well known that if coaxial cables for a radio system are adjacent to each other or adjacent to a conductive member, noise in the radio signal carried by any of the cables or tower can be generated and shared. Such is particularly prevalent in situations where one or more coaxial cables are utilized with a tower which may carry multiple antennas. Typically, these cables are merely strung around and periodically attached to the conductive tower which results in the generation of noise in the signals carried by the cables. It is also likely that when multiple cables are carried by the tower, they could interact with each other thereby generating noise in the signals that they are carrying.

Thus, the need exists for a system which isolates coaxial cables from each other and from the tower carrying one or more antennas.

DISCLOSURE OF THE INVENTION

It is thus an object of one aspect of the present invention to provide a system which isolates a coaxial cable from a tower carrying an antenna serviced by that cable.

It is an object of another aspect of the present invention to provide a system, as above, which isolates a plurality of coaxial cables from each other when used with a tower carrying multiple antennas and coaxial cables.

These and other objects of the present invention, as well as the advantages thereof over existing prior art forms, which will become apparent from the description to follow, are accomplished by the improvements hereinafter described and claimed.

In general, an apparatus is adapted to isolate cables from each other and from a tower which carries antennas. The apparatus includes a plurality of plates attached to the tower at spaced locations along the height of the tower. Each plate has an aperture for each cable, and the apertures are spaced from each other and spaced from the tower.

A system in accordance with the present invention is provided to carry cables isolated from each other and isolated from a tower which carries antennas for the cables. The system includes a support plate assembly carried near the top of the tower and carrying the cables. An additional plate assembly is carried near the bottom of the tower and is adapted to attach the cables to a receive/send unit. A plurality of guide plate assemblies are attached to the tower at spaced locations along the height of the tower between the support plate assembly and the additional plate assembly. The guide plate assemblies maintain the cables spaced from each other and spaced from the tower.

A preferred exemplary coaxial cable isolation system according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
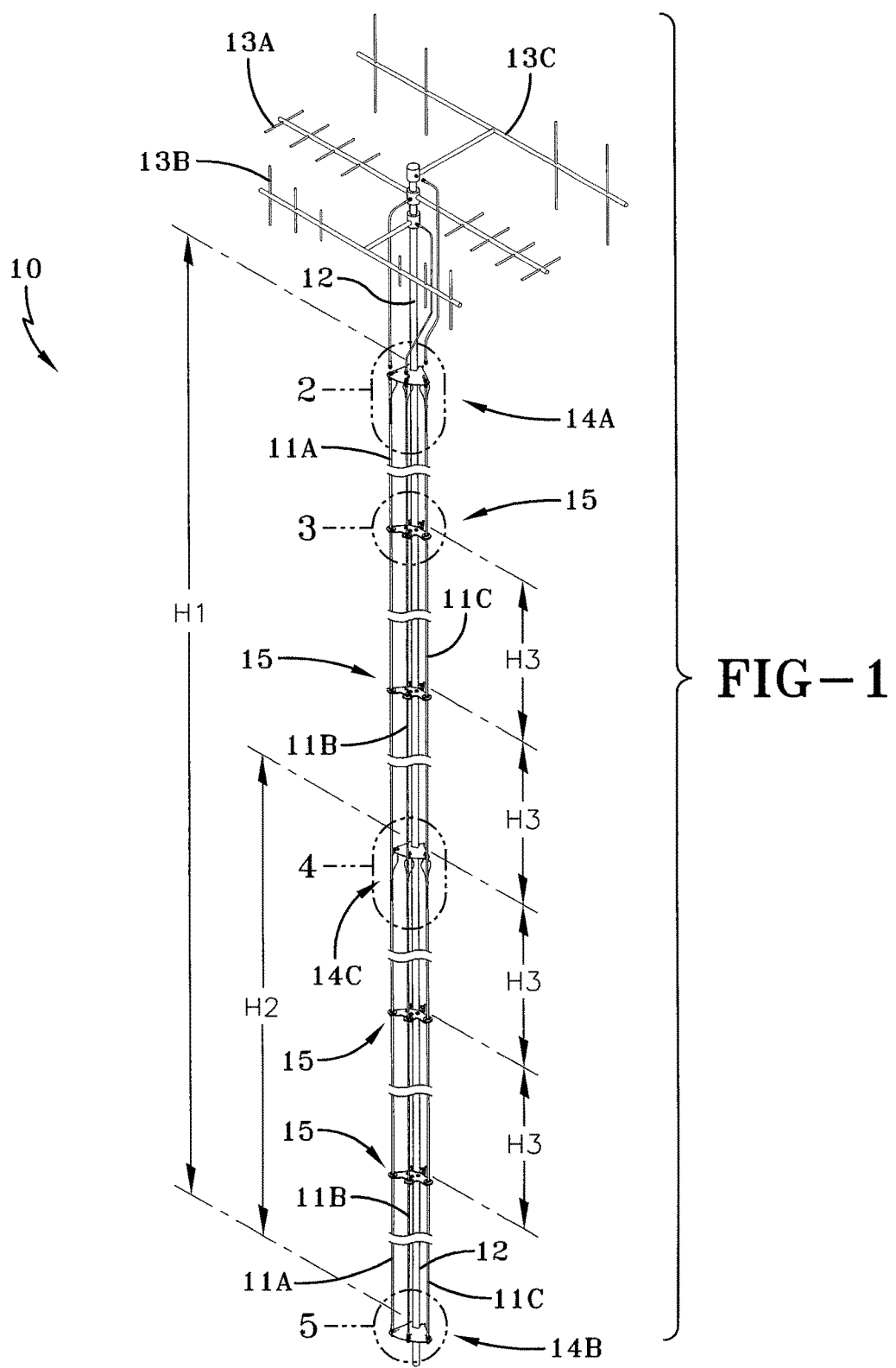
FIG. 1 is a somewhat schematic depiction of an antenna tower having the coaxial cable isolation system of the present invention.

A system, generally indicated by the numeral 10 in FIG. 1, isolates coaxial cables 11A, 11B and 110 from each other and from an antenna tower 12. Typically, an antenna tower 12 may extend one hundred or more feet in the air and often carries a plurality of schematically shown antennas 13A, 13B and 13C at the top thereof. A communications cable 11 is provided for each antenna 13 carried by tower 12, and the system 10 is designed to isolate cables 11 from each other and from tower 12 to prevent noise in the cables 11 as previously described.

Figure 2:
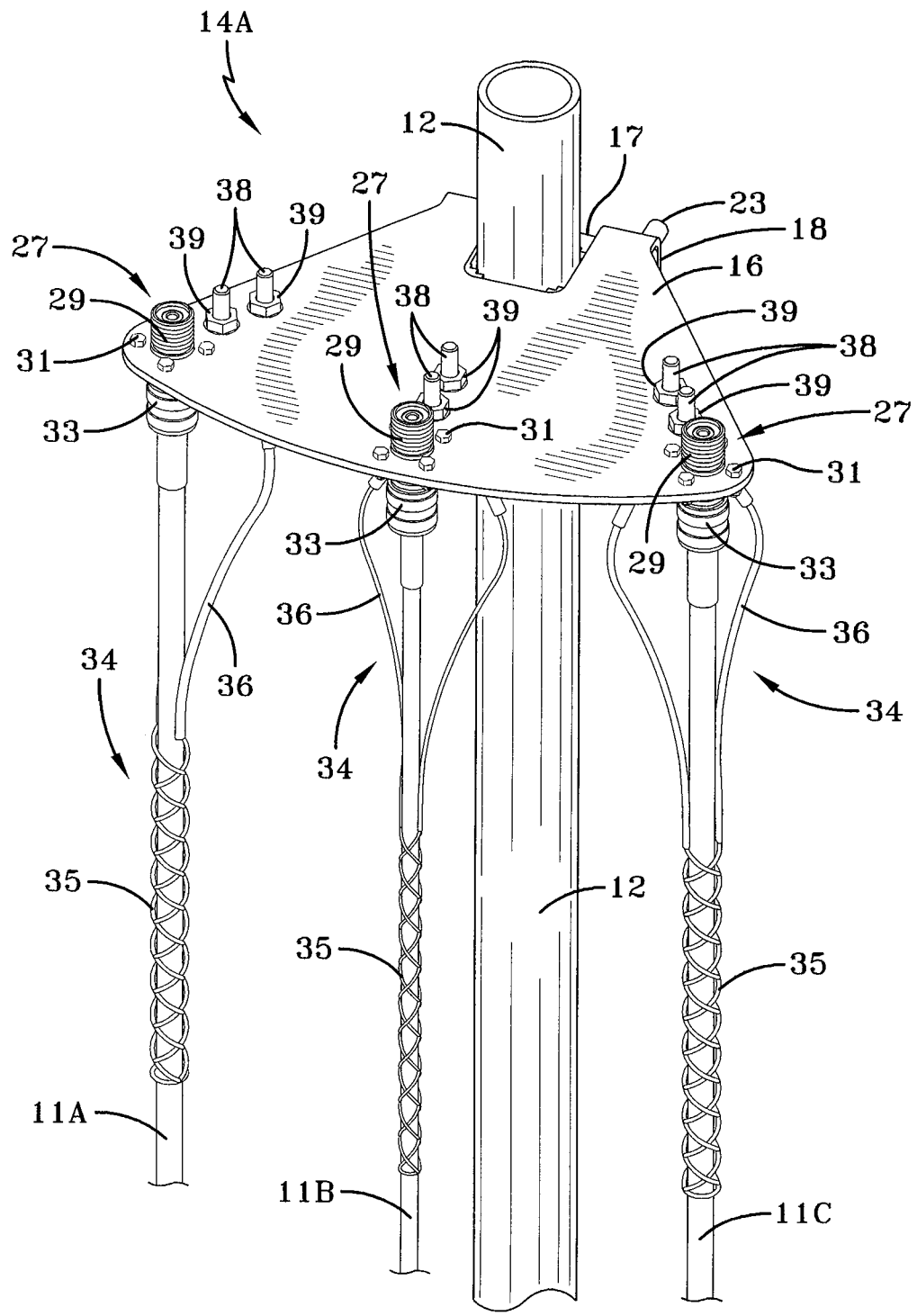
FIG. 2 is a perspective view of that portion of the cable isolation system depicted in the encircled area 2 of FIG. 1.
Figure 5:
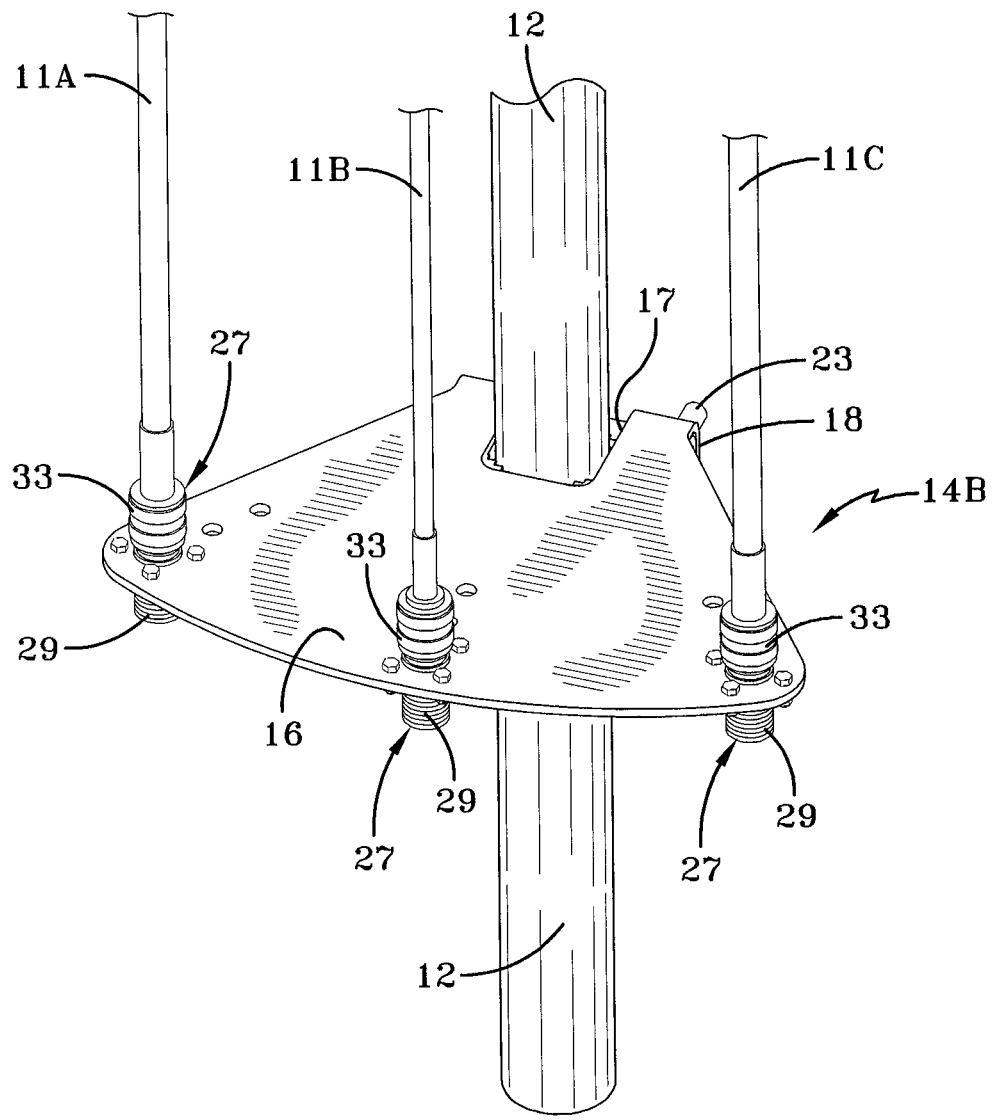
FIG. 5 is a perspective view of that portion of the cable isolation system depicted in the encircled area 5 of FIG. 1.
Figure 6:
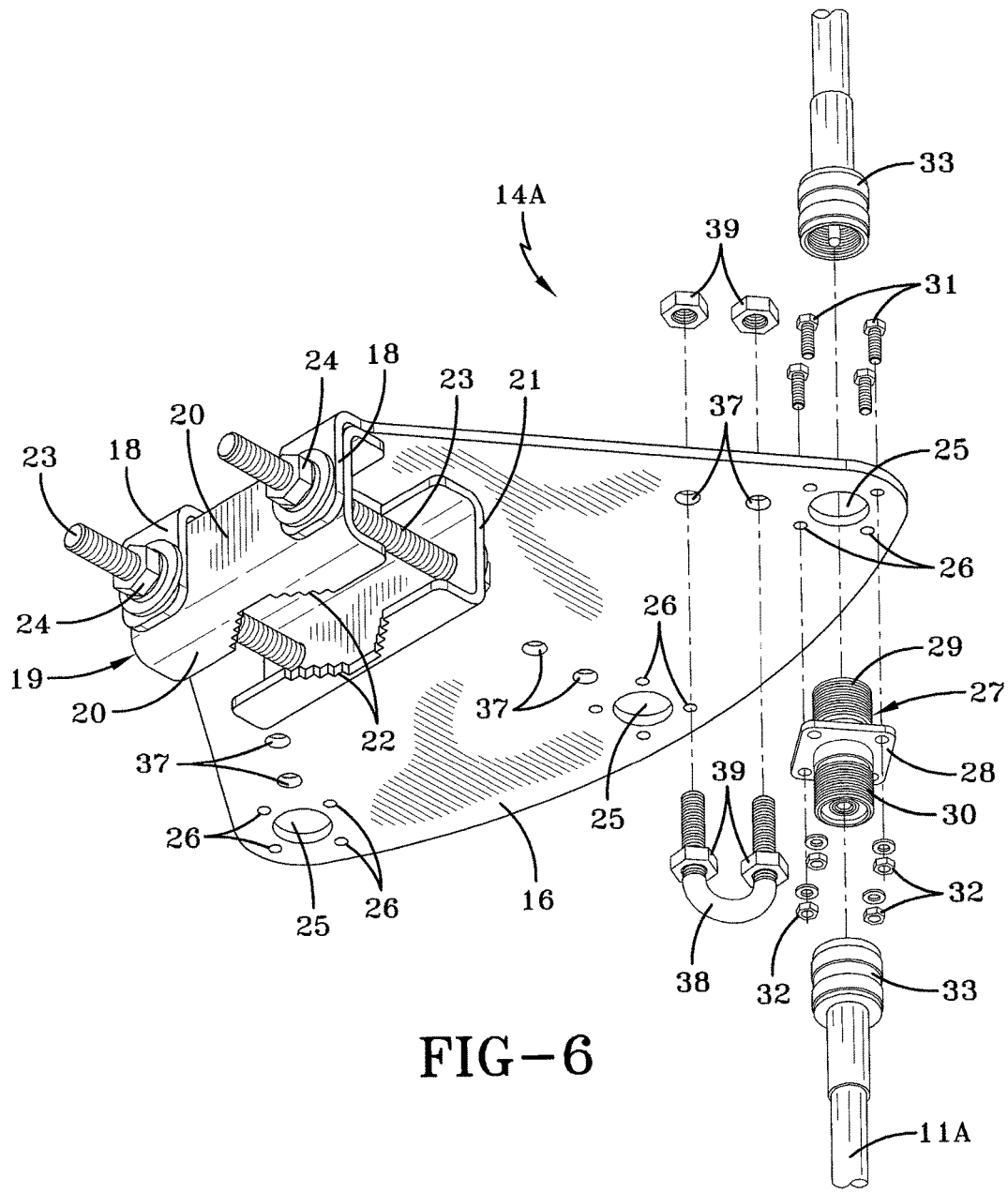
FIG. 6 is a bottom perspective view of the component of the cable isolation system shown in FIG. 2.

System 10 includes a plurality of elements all of which are carried by tower 12. These elements include support plate assemblies generally indicated by the numeral 14. An upper support plate assembly 14A is mounted near the top of tower 12 as shown in FIGS. 2 and 6. A similar support plate assembly 14B may be conveniently used and mounted near the bottom of tower 12 as shown in FIG. 5, and as will hereinafter be described, one or more support plates assemblies 14C may be utilized at one or more intermediate positions along the length of tower 12, as shown in FIG. 4.

Figure 3:
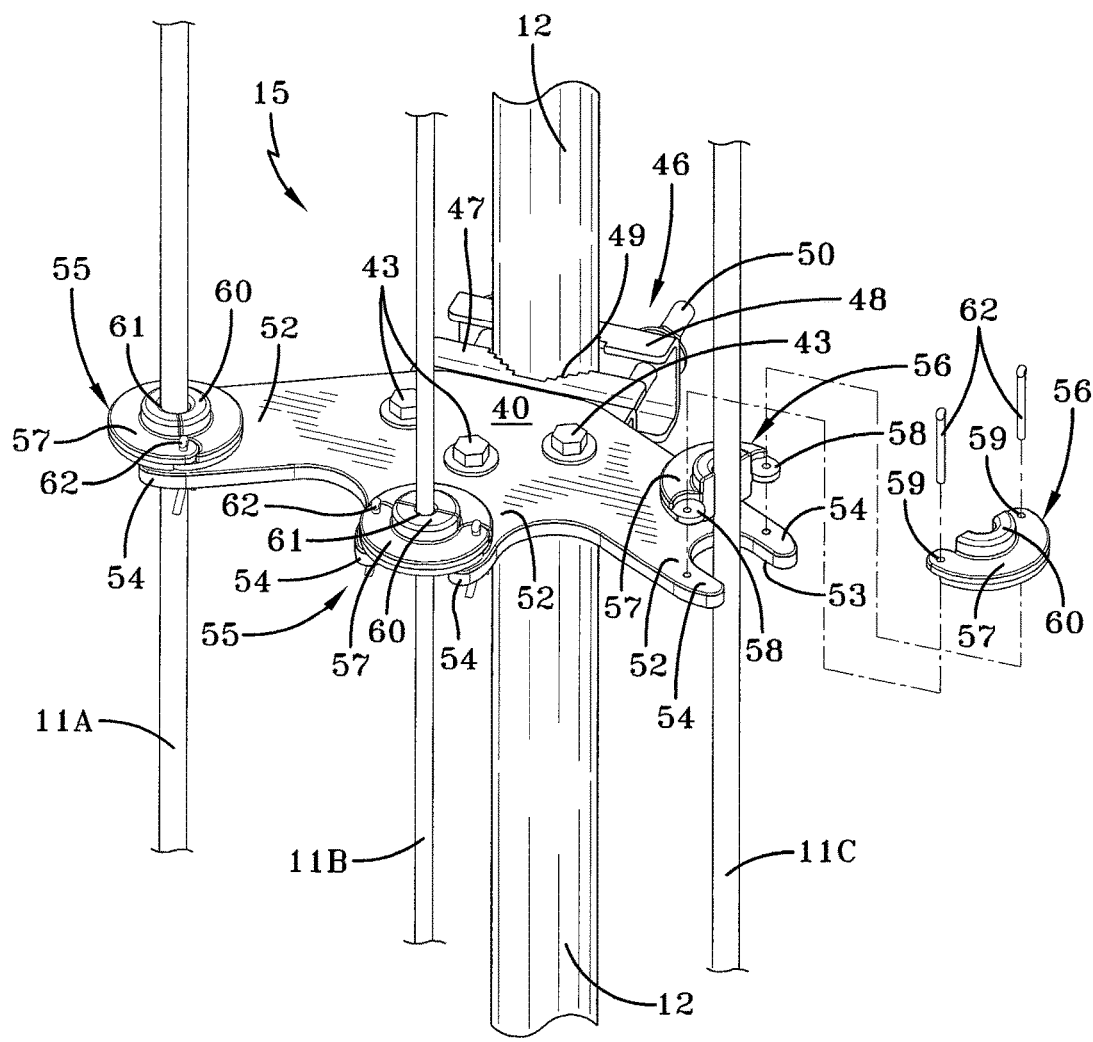
FIG. 3 is a perspective view of that portion of the cable isolation system depicted in the encircled area 3 of FIG. 1.
Figure 4:
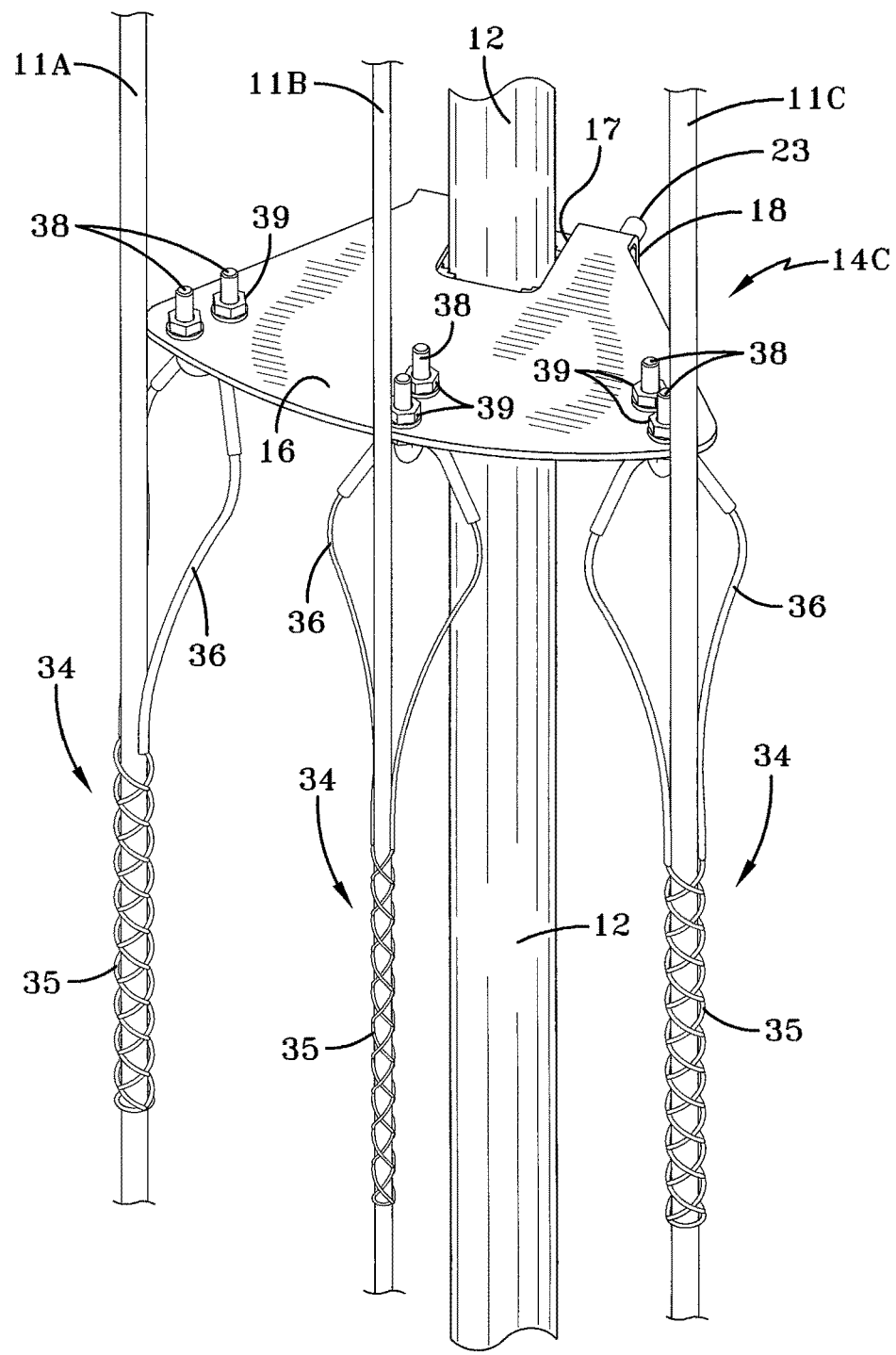
FIG. 4 is a perspective view of that portion of the cable isolation system depicted in the encircled area 4 of FIG. 1.

Other elements of system 10 include guide plate assemblies generally indicated by the numeral 15 and shown in FIGS. 3 and 4. A plurality of guide plates assemblies 15 are carried by tower 12 periodically along its length, as will hereinafter be described.

As shown in FIGS. 2 and 6, the support plate assembly 14A carried near the top of tower includes a generally flat plate 16 having a cutout 17 at one end thereof. Plate 16 is made of a non-conductive material such as glass filled nylon. Tabs 18 extend downwardly from plate 16 at each side of cutout 17. Cutout 17 is adapted to receive tower 12, and tabs 18 of plate 16 are utilized to connect plate 16 to tower 12 by an attachment system generally indicated by the numeral 19 as shown in FIG. 6.

Attachment system 19 includes opposed U-shaped brackets 20 and 21 each having an opening with serrations 22. When assembled, serrated openings 22 are opposed to each other and are adapted to grip tower 12. To attach the tower 12, the base of bracket 20 is positioned against the inside of tabs 18, and bolts 23 extend through apertures in the base of bracket 21, through the base of bracket 20, and through apertures in tabs 18. Bolts 23 receive washer and nut assemblies 24 on the outer side of tabs 18 such that when bolts 23 are tightened, brackets 20 and 21 approach each other until serrations 22 tightly grip tower 12.

Plate 16 is adapted to carry the three antenna cables 11A, 11B, 11C, for use in the event that tower 12 is carrying three antennas 13A, 13B, 13C. Of course, plate 16 could be utilized for less than three cable and antenna combinations, and if more than three antennas were being carried by tower 12, a second plate assembly 14A could be utilized and mounted to tower 12 diametrically opposed to the first plate assembly. As such, the present invention could easily service a tower 12 that might be carrying up to six antennas.

The outer end of plate 16, that is, the end opposite to tabs 18, is provided with three arcuately spaced apertures 25 each of which are surrounded by four smaller holes 26. Conventional double connector assemblies, known in the art as a double SO-239 connectors, are generally indicated by the numeral 27. Each connector assembly 27 includes a small plate 28 with threaded connectors 29 and 30 extending in opposite directions therefrom. A threaded connector 29 is positioned through each aperture 25 and plate 28 is attached to the bottom of plate 16 by means of fasteners 31 which extend through holes 26 to receive washer and nut assemblies 32. The cables 11A, 11B and 11C are attached to connectors 30 by means of end connectors 33 carried by the cables. End connectors 33 are known as conventional PL-259 connectors. Cables 11A, 11B and 11C are thus connected to plate 16, and the antennas 13A, 13B and 13C can be connected to cables 11A, 11B and 11C by means of cables (not shown) having end connectors (not shown) which are like end connectors 33 and which are intended to be attached to threaded connector 29.

Because a long length of cables would expose plate 16 to a great deal of weight, each cable is provided with a strain relief grip, generally indicated by the numeral 34 which can be a KELLEMS® strain relief grip, which is available from Hubble Incorporated of Shelton Conn. Each grip 34 includes a mesh end 35 which is positioned on each cable, and an eye or loop end 36 which is carried by plate 16. To that end, plate 16 is provided with two spaced apertures 37 which are positioned inwardly from each aperture 25. The loop end 36 of each grip 34 is positioned between the threaded legs of a U-bolt 38, and the legs are then received through apertures 37. The U-bolts 38 can then receive nuts 39 so that they are attached to plate 16. As such, the grips 34 which are carried by U-bolts 38 ease the strain that the cables 11 place on plate 16.

In the event that the tower 12 is extremely high, for example having a height H1 of two hundred feet, another support plate assembly 14C could be positioned at height H2, for example, one hundred feet from the top. This optional support plate assembly 14C would be intended to further carry the load of the cables 11. As shown in FIG. 4, the support plate assembly 14B is generally identical to the top support plate assembly 14A in that it includes a plate 16 which carries the KELLEMS® strain relief grips 34, and it is attached to tower 12 in the same manner as plate 16 in assembly 14A. However, there is no need for cable connectors and the like as the cables 11A, 11B and 11C may merely pass outside of plate 16 instead of through plate 16. It should be appreciated by one skilled in the art that any number of longitudinally spaced support plates may be utilized at any desired spacing dependent on the height of tower 12 and the weight of the cables 11.

Near the bottom of tower 12, a bottom support plate assembly 14B is provided, as shown in FIG. 5. This support plate assembly 14B includes a plate 16 which is attached to the tower 12 in the same manner as plate 16 of assembly 14A. However, there is no need for the provision of a strain relief grip, but rather only the cable connection features are provided. Thus, the ends of the cables are provided with end connectors 33 which are attached to threaded connectors 30 of connector assembly 27. The threaded connector 29 is utilized to attach the cables of a send/receive unit to the antennas.

In order to maintain cables 11A, 11B and 11C spaced form each other and spaced from tower 12 throughout its entire height, the guide plate assemblies 15 are carried by tower 12 at longitudinally spaced intervals along the height of tower 12. For example, dependent on the overall height of tower 12, the guide plate assemblies could be spaced at a height H3 of ten feet, twenty feet, or at an appropriate distance based on the circumstances.

Figure 7:
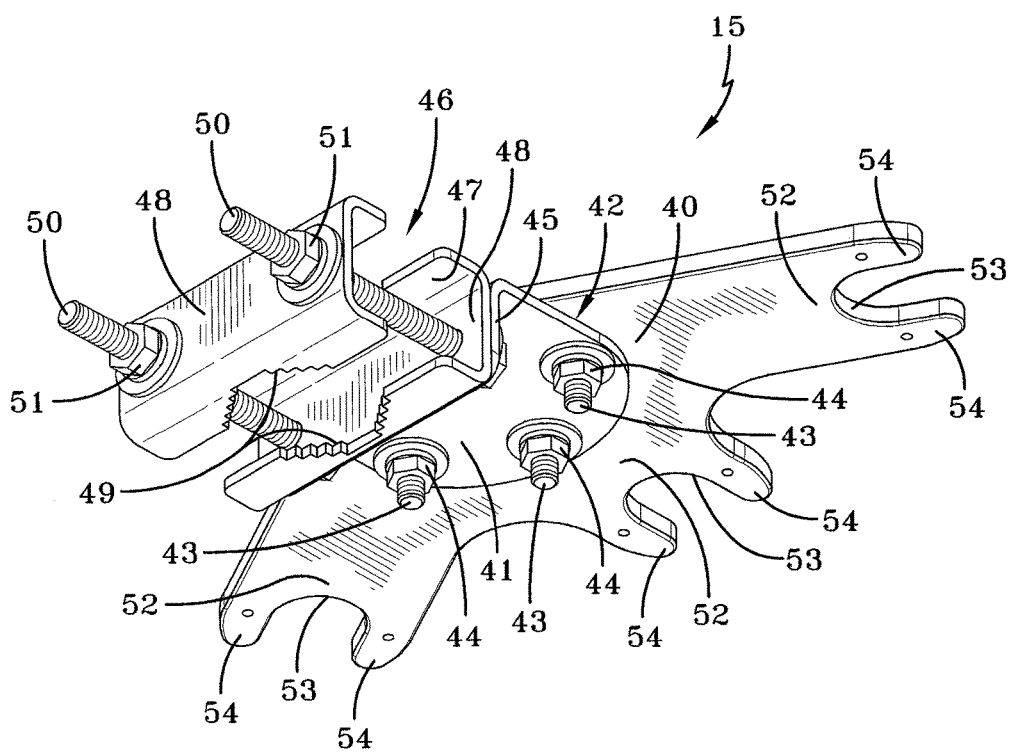
FIG. 7 is a bottom perspective view of the component of the cable isolation system shown in FIG. 3.

As shown in FIGS. 3 and 7, each guide plate assembly 15 includes a generally flat plate 40 made of a non-conductive material such as glass filled nylon. The base 41 of an L-shaped plate, generally indicated by the numeral 42, is attached to plate 40 as by fasteners 43 secured with nut and washer assemblies 44. The flange 45 of plate 42 provides a bearing surface to receive an attachment system, generally indicated by the numeral 46, for connecting plate 40 to tower 12. Attachment system 46 can have identical components to that of attachment system 19 previously described. As such, attachment system 46 includes opposed U-shaped brackets 47 and 48 each having a serrated opening 49. When assembled, serrated openings 49 are opposed to each other and are adapted to grip tower 10. The base of bracket 47 is positioned flush against flange 45 of plate 42. Bolts 50 extend through apertures in flange 45, through the base of bracket 47, and through apertures in bracket 48 to receive washer and nut assemblies 51 on the base of bracket 48. Thus, when bolts 50 are tightened, brackets 47 and 48 approach each other until serrations 49 tightly grip tower 12.

Each plate 40 is configured with three arms 52. Each arm 52 is provided with a generally U-shaped cutout 53 thereby forming spaced prongs 54. Each cutout preferably receives a cable guiding insert generally indicated by the numeral 55. Each insert 55 is preferably made of two identical halves 56. Each half 56 includes a U-shaped base 57 having a cutout area 58, that is, an area of less thickness at the ends thereof. Apertures 59 extend through the cutout area 58. A U-shaped hub 60 is positioned within the U of base 57 and extends above and below base 57. The halves are combined with each other to form the guiding insert 55 by facing the cutout area 58 of one half 56 against the cutout area 58 of the other half 56. As such apertures 59 align and the opposed hubs 60 form an aperture 61 to receive a cable 11. After a cable 11 is positioned in aperture 61, the assembled guiding member 55 may then be connected to plate 40. Thus, the opposed hubs 60 of the assembled guiding member 55 are received within cutout 53 between prongs 54 of each arm 52, and fastening devices, preferably on the form of cotter pins 62 extend through aligned apertures 59 and apertures 63 in the spaced prongs 54.

The configuration of the cable guiding inserts 55 just described provides an advantage in that they may be custom made for the size of the cable 11 being guided. That is, cables often come in different diameters. For example, as shown in the drawings, cables 11A and 11C are of a larger diameter than cable 11B. A difference in cable size can be accomplished by providing cable guiding inserts 55 with different sized apertures 61.

In summary as to the operation of system 10, cables 11A, 11B and 11C are carried by plate 14A away from each other and away from tower 12. The weight of the cables is supported by grips 34. As the cables extend down the tower 12 toward the ground, the spacing is maintained by periodically longitudinally spaced guide plate assemblies 15 until the cables reach the bottom support plate 14B where they can be connected to the user's send/receive unit.

It should thus be appreciated that a system described herein accomplishes the objects of the invention and otherwise substantially improves the art.

What is claimed is:

1. Apparatus adapted to isolate cables from each other and from a tower which carries antennas, the apparatus comprising a plurality of plates attached to the tower at spaced locations along the height of the tower, each said plate having apertures for each cable, said apertures being spaced from each other and spaced from the tower,
   wherein an uppermost of said plates carries the cables and includes a connector assembly received in each said aperture, each said connector assembly being adapted to connect a cable to said uppermost plate, and
   a strain relief grip for each cable carried by said uppermost plate, each said grip having a mesh which engages each cable.

2. The apparatus of claim 1 further comprising a plurality of inserts carried by each said plate, one of said inserts forming one of said apertures.

3. The apparatus of claim 2 wherein each said insert includes opposed insert halves, said insert halves having opposed U-shaped hubs, said hubs forming said apertures of a preselected size dependent on the size of the cable when said halves are positioned together and carried by said plate.

4. The apparatus of claim 1 further comprising an attachment system for attaching each said plate to said tower, each said system including a first bracket having an opening to receive the tower and carried by each said plate, a second bracket having an opening facing the opening of said first bracket, and means to move said second bracket toward said first bracket with the tower positioned in said openings to attach each said plate to the tower.

5. The apparatus of claim 1 further comprising an intermediate plate carried by the tower and spaced from said uppermost plate, the cables passing by adjacent to said intermediate plate, and a strain relief grip for each cable carried by said intermediate plate and having a mesh which engages each cable.

6. The apparatus of claim 1 wherein a lowermost of said plates includes a connector assembly received in each said aperture, each said connector assembly being adapted to connect a cable to said lowermost plate.

7. A system adapted to carry cables isolated from each other and from a tower carrying antennas for the cables, the system comprising a support plate assembly carried near the top of the tower and carrying the cables, an additional plate assembly carried near the bottom of the tower and adapted to attach the cables to a receive/send unit, and a plurality of guide plate assemblies attached to the tower at spaced locations along the height of the tower between said support plate assembly and said additional plate assembly, said guide plate assemblies maintaining the cables spaced from each other and spaced from the tower,
   wherein all of said plate assemblies include a plate and an attachment system for attaching said plate to the tower, said attachment system including a first bracket attached to said plate and having an opening to receive the tower, a second bracket having an opening facing said opening of said first bracket, and means to move said second bracket toward said first bracket with the tower positioned in said openings to attach said plate to the tower.

8. The system of claim 7 wherein said support plate assembly includes a plate and spaced connector assemblies carried by said plate, said connector assemblies be utilized to connect the cables to said plate and to the antennas.

9. The system of claim 8 wherein said support plate assembly includes a strain relief grip for each cable.

10. The system of claim 9 wherein each said strain relief grip includes a mesh portion engaging each said cable and a loop portion, said support plate assembly including a U-bolt attaching said loop portion to said plate.

11. The system of claim 7 wherein each said guide plate assembly includes a plate having an aperture for each cable to pass through, said apertures being spaced from each other and spaced from the tower.

12. The system of claim 11 wherein each said guide plate assembly includes an insert for each cable and carried by said plate, said inserts determining the size of said apertures.

13. The system of claim 12 wherein each said insert includes opposed insert halves, said insert halves having opposed U-shaped hubs, said hubs forming said apertures of a preselected size dependent on the size of the cable when said halves are positioned together and carried by said plate.

14. A system adapted to carry cables isolated from each other and from a tower carrying antennas for the cables, the system comprising a support plate assembly carried near the top of the tower and carrying the cables, an additional plate assembly carried near the bottom of the tower and adapted to attach the cables to a receive/send unit, a plurality of guide plate assemblies attached to the tower at spaced locations along the height of the tower between said support plate assembly and said additional plate assembly, said guide plate assemblies maintaining the cables spaced from each other and spaced from the tower, a second support plate assembly spaced from said support plate assembly, said second support plate assembly including a plate carried by the tower, the cables being positioned adjacent to said plate, and a strain relief grip for each cable carried by said plate and having a mesh which engages each cable.

15. A system adapted to carry cables isolated from each other and from a tower carrying antennas for the cables, the system comprising a support plate assembly carried near the top of the tower and carrying the cables, an additional plate assembly carried near the bottom of the tower and adapted to attach the cables to a receive/send unit, and a plurality of guide plate assemblies attached to the tower at spaced locations along the height of the tower between said support plate assembly and said additional plate assembly, said guide plate assemblies maintaining the cables spaced from each other and spaced from the tower, wherein said additional plate assembly includes a plate and spaced connector assemblies carried by said plate, each connector assembly being adapted to connect a cable to said plate.

* * * * *